Patented Apr. 16, 1940

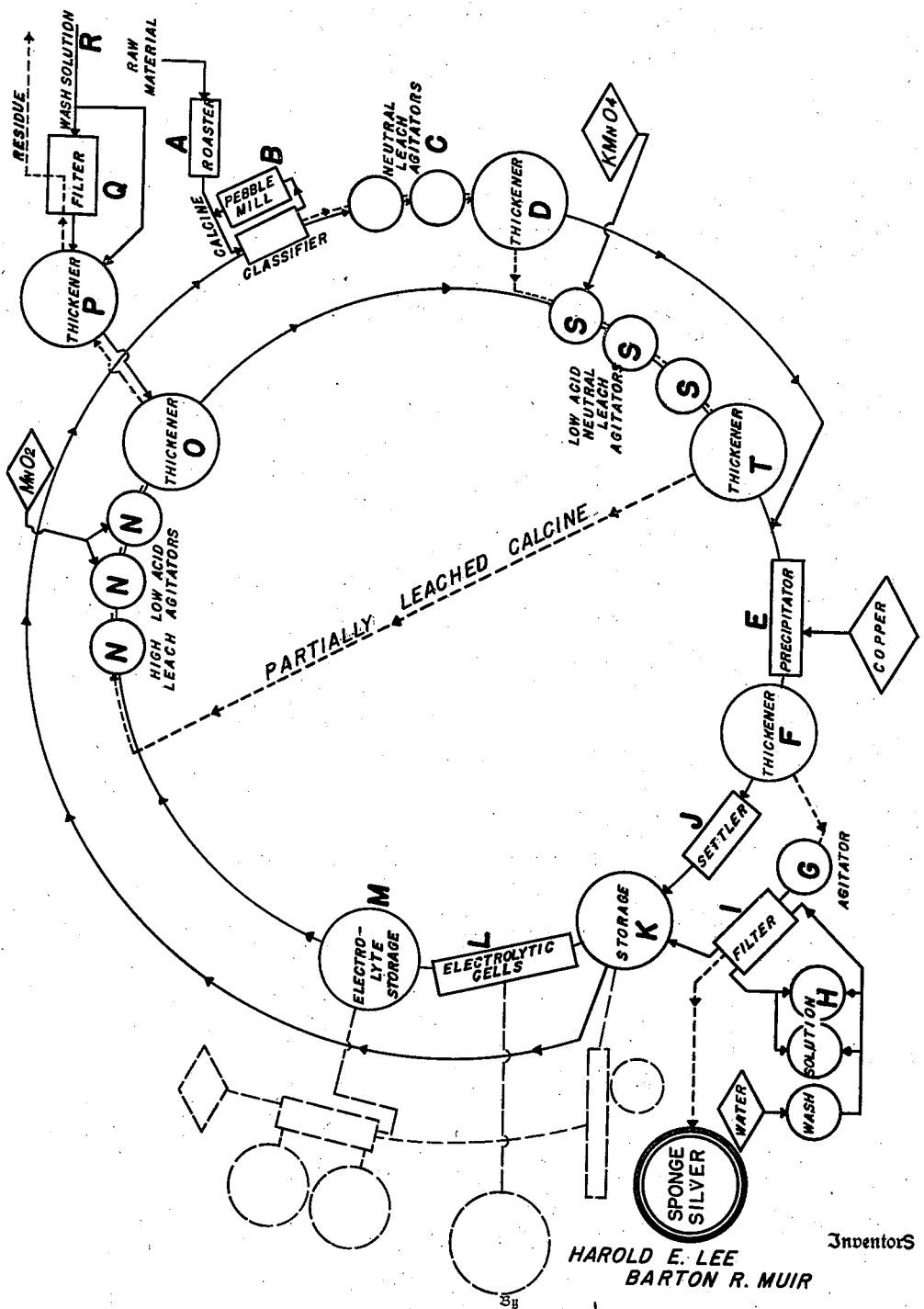

2,197,272

UNITED STATES PATENT OFFICE 2,197,272

PROCESS FOR EXTRACTING SILVER FROM ORES, CONCENTRATES, OR OTHER MATERIALS

Harold Eugene Lee and Barton Robert Muir, Kellogg, Idaho, assignors to Bunker Hill & Sullivan Mining & Concentrating Company, Kellogg, Idaho, a corporation Application April 23, 1938, Serial No. 203,968

6 Claims. (Cl. 75—118)

Our present invention relates to an improved process for extracting silver from ores, concentrates, or other materials, and more particularly to the hydro-chemical extraction and recovery of silver, or silver in conjunction with other elements from materials which contain varying proportions of silver in the metallic state, or in which the silver is associated with constituents, such as ferrous sulphate, or the lower oxides of iron or copper, metallic copper, or other such substances capable of precipitating it to the metallic state.

The process contemplates the treatment and reduction of silver-bearing materials not amenable to the usual direct leaching methods, or, because of the nature and concentration of associated constituents, to direct smelting methods, such as silver and gold bearing lead-copper sulphide mixtures containing varying proportions of iron, antimony, arsenic, zinc, bismuth, selenium, tellurium, and other objectionable impurities.

The process in general comprises the roasting of the ore, concentrate, or other material, to a calcine in proper manner as hereinafter fully described, delivering the calcine to a neutral leach circuit, or if desired to an acid leach circuit or combinations of both, in which a balance of ferric ion concentration over ferrous ion concentration favorable to the solution of metallic silver is maintained, preferably by the use of suitable oxidizing agents such as potassium permanganate, or manganese dioxide; thickening, washing, and filtering the leached solids; subjecting the resultant solutions to operations for precipitation of the dissolved silver; and the recovery of the precipitated silver.

The hydro-chemical extraction of silver from materials in which silver is soluble or has been rendered soluble, to neutral or acidified solutions is decreased in proportion to the concentration of associated substances such as ferrous sulphate, the lower oxides of iron or copper, metallic copper, or other constituents capable of precipitating silver as metallic silver from solution.

It has been determined that the concentration of such detrimental constituents may be effectively controlled by adequate heat treatment prior to leaching; or by the use of suitable oxidizing agents, such as potassium permanganate or manganese dioxide, during the leach; as well as by combinations of both these steps; thus allowing the silver extractions at substantially higher percentages than those otherwise obtainable. It has also been determined that lowered silver extractions, due to the presence of metallic silver, either as a constituent of the original product, or formed during subsequent treatment operations, may be substantially increased by the use of ferric sulphate, either directly, as an addition agent, or formed through the use of addition agents, or formed as an inherent product of the operation, in conjunction with the maintenance of a balance between the ferric ion concentration and the ferrous ion concentration, preferably by the use of suitable oxidizing agents such as potassium permanganate, or manganese dioxide which favors the following reaction to proceed to the left:

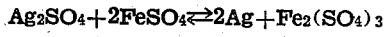
$$Ag_2SO_4 + 2FeSO_4 \rightleftarrows 2Ag + Fe_2(SO_4)_3$$

Application of the principles and procedure comprising this invention enables the attainment of substantially higher silver extraction than would otherwise result from the treatment of materials within the scope thereof, in neutral solutions or sulphuric acid solutions of variable dilution.

In accordance with the present invention the silver is hydro-chemically extracted from ores, concentrates, or other materials, in which the silver is soluble, or has been rendered soluble by exposure to suitable roasting conditions to form a calcine, and the recovery of silver, as metallic sponge, by precipitation on an electro-positive metal, or by electro-deposition as metallic silver, the silver barren solution being either wasted, circulated as return solvent, or subjected to subsequent treatment for the recovery of other values contained in the solution.

In the accompanying drawing, we illustrate a diagrammatic view of the flow sheet of a suitable apparatus by which the following process may be carried out in a particular application to a material in which the silver is associated with copper. This flow sheet is included as a part of the disclosure to illustrate the various stages of the process and the direction of the flow taken by the solutions and solids. The drawing in conjunction with the application of the process to one specific type of material will afford a full understanding of the nature of the invention depicting its full range and the improved results obtained thereby.

In a preferred method of carrying out our process, particularly adaptable to sulphide ores or concentrates, the silver content, or silver in conjunction with other components, may be brought to a soluble state by roasting at A the material under suitable conditions of time and temperature as to render the maximum percentage of silver as the water soluble silver sulphate; render the maximum percentage of other desired constituents to forms soluble in neutral or acidified solutions; to prevent or tend to prevent the formation of insoluble compounds of silver or other constituents desired leached; to insure the presence of the minimum concentrations of ferrous sulphate, metallic copper, the lower oxides of iron and copper, or other components that act as silver precipitants in subsequent leaching operations; to prevent excessive sintering of the charge when appreciable quantities of low fusion point constituents, such as lead and antimony sulphides are present; and to eliminate the maximum percentage of undesirable volatile impurities.

The material, when properly calcined, may be delivered to the leaching circuit and the solution of silver effected continuously or in batches, in either case utilizing one or more leach steps, depending upon the concentration of silver and the nature of associated constituents. In the treatment of silver rich materials, bearing relatively high proportions of silver sulphate, a preliminary leach at C in neutral solvent may be preferable. While a single neutral leach, followed by suitable decanting and washing operations, may suffice, usually the presence of residual metallic silver makes desirable its subsequent treatment in acid solutions, where the solvent power of ferric sulphate for metallic silver is much more effective. In cases where the silver content of the material being treated is associated with other constituents, such as copper, the desired additional silver leaching stages may be effected in conjunction with subsequent operations for the extraction of copper.

The effect of silver precipitants, during the leaching operations, may be circumvented and the solution of metallic silver enhanced through the maintenance of a balance of excess ferric ion concentration over ferrous ion concentration, such as to favor the reaction to proceed to the right:

$$2Ag + Fe_2(SO_4)_3 \rightleftarrows Ag_2SO_4 + 2FeSO_4$$

the ferric sulphate being added as an addition agent, or preferably formed from iron inherent to the system, by the use of oxidizing agents, such as manganese dioxide, alone, or in combination with air, potassium permanganate, or other suitable oxidizing agents known to the arts.

In operations for the combined extraction of silver and copper from silver rich materials, when an initial neutral leach for silver is preferable, the neutral solvent may be maintained of sufficient copper concentration, without appreciably affecting the solubility of the silver, to allow its blending with the solution resulting from the low acid to neutral leach flowing to the continuous silver precipitator.

In such cases, as illustrated by the accompanying drawing, the calcined material may be entered into the neutral leach system C, through a classifier B which is set in closed circuit with a suitable grinding appliance. The classifier overflow is continuously conveyed to a series of agitators and treated under suitable conditions of time and temperature for the solution of the major portion of the silver; then the pulp conveyed to a decanting thickener or thickeners D, and the silver rich overflow passed to a precipitator E, whereby the solution is freed of dissolved silver by chemical displacement by copper, the solution and suspended silver sponge being conveyed to a thickener, or thickeners F, that discharge the thickened silver pulp through an agitator G to intermittent washing H and filtration I. The silver barren overflow may be passed through an additional settler J and thence to storage K for circulation as neutral leach solvent or to subsequent steps for the recovery of copper.

The thickened, partially leached roast from the neutral leach may be pumped to a series of agitators S with partially neutralized acid solvent, the proportion of sludge being in excess of that required to neutralize the free acid. By the addition of sufficient excess sludge and the use of adequate time and temperature conditions, preventing solution short circuits by the use of a sufficient number of agitators in series, the solution may be thoroughly neutralized and rendered, for all practical purposes, free of objectionable impurities.

From the last of these agitators the pulp, consisting of neutralized silver bearing copper solution and suspended solids, passes to a decanting thickener or thickeners T, in which the solution is separated from the solids. The thickener overflow is treated in a manner identical to that described above for the solutions resulting from the neutral leach. The silver barren solution from both the above steps, may be treated for the recovery of copper as copper sulphate by evaporation, or for the recovery of copper as cement copper by precipitation on an electropositive metal, or, as shown by the accompanying specific illustration, it may be conveyed to electrolytic cells L for the regeneration of acid and the eelctro-deposition of copper as metallic copper.

The regenerated electrolyte, or new acid M, in cases where the copper is recovered as copper sulphate or cement copper, may be fed to the first of a third series of agitators N along with the sludge underflow from the low acid to neutral thickener or thickeners, the proportion of acid solvent utilized being such that the leached pulp leaving the last leaching agitator of this series will contain free acid, in order that the resulting solids may be free or substantially free from all undissolved soluble silver and copper.

The leached pulp then passes to the first of a series of decanting thickeners O, where the dissolved values are washed by counter-current decantation. This is done in a manner known to the arts in which the thickeners are arranged in a series of steps, one above the other, the first of these thickeners O, which receives the leached pulp, being the lowest and the final, or discharge thickener P being at the highest level of the series.

In this arrangement the underflow of the first washing thickener is pumped to the well of the second, and so on to the well of the last washing thickener. Wash solution R is added to the well of the last thickener and overflows through the series, counter-current to the advancing solids, overflowing from the first of the series as partially neutralized electrolyte, or acid, and conveyed to the first of the low acid to neutral agitators S.

The underflow from the last of the series of washing thickeners is pumped to a filter Q where it is washed in wash solution R and dewatered. The filtrate from this operation is pumped to the well of the last washing thickener P and the cake discharged.

In a specific case, applicable to the general preferred treatment illustrated by the drawing, about 250 tons of material containing 10.5 per cent moisture and the following range of composition: 1650 oz. Ag/ton; 20 per cent copper; 11 per cent lead; 12 per cent iron; 5 per cent insoluble; 0.25 per cent bismuth; 25 per cent sulphur; 18 per cent antimony; 1.5 per cent arsenic; was calcined at the rate of 35 to 40 tons per 24 hours in a Wedge type multiple hearth furnace. A calcine was produced which, when subjected to the leach conditions outlined above, resulted in the extraction of over 96 per cent of the silver, the silver being quickly recovered in a form suitable for direct cupellation and the copper as cathode copper of purity equal to that produced in geenral by the prior methods. The resulting residue, reduced in mass and stripped of the bulk of its silver and copper was discharged in a form more readily amenable to further treatment by smelting or other methods, for the recovery of residual values contained.

The roasting step was conducted during the early stages of the operation at a temperature ranging from 400° C. to 450° C., and during the latter stages at approximately 600° C. The calcined discharge was screened to a desirable size, and the oversize was crushed and returned for additional roasting. This returned material greatly aided in the control of temperature during the early roasting stages, which control is necessary when handling materials containing easily fusible constituents such as lead and antimony sulphides. In the particular case described above, the return of about 20 per cent of the calcined discharge was adequate for maintaining the desired temperature conditions.

In the case constituting this illustration, the discharged calcine for the leaching operation was screened to a −6 mesh and entered to the system through a classifier with neutral solvent, as depicted on the accompanying diagram. The coarse material was raked to a suitable grinding appliance which was set in closed circuit with the classifier. The classifier fines continuously overflowed to an agitator or agitators where suitable time and temperature conditions were allowed for the solution of the bulk of the silver, the solvent and suspended solids continuously discharged from the agitation operation to a decanting thickener, or thickeners, the overflow of which passed continuously to and through a precipitator in which the solution was freed of its silver content, and thence to a decanting thickener, or thickeners, wherein the suspended silver solids were thickened, the clarified silver free solution going to a general copper sulphate storage and the underflow conducted through an agitator to a filter where it was washed and the washes advanced until of sufficient concentration to flow to the general copper sulphate storage units, and the washed sponge cake discharged in a form suitable for direct cupellation.

The underflow sludge of the initial leaching operation was conducted continuously to the first of a series of agitators where it met partially neutralized electrolyte in proportions and under conditions described in foregoing considerations, passing through and discharging from the last of the series to a decanting thickener or thickeners, the overflow of this thickener or thickeners joining the overflow from the initial leach thickener or thickeners and the underflow sludge being conducted to the first of the final series of agitators along with regenerated acid of proportions to provide free acid in the overflow of the last agitator of the series.

The acidified discharge of the final series of agitators was conveyed to a series of counter-current decanting thickeners where the pulp was advanced counter-currently against solution of decreasing acid and value content and finally pumped to a filter where it was filtered and discharged, the filtrate being pumped to the well of the last thickener of the counter-current decantation series.

The solution in the general copper sulphate storage unit was utilized as return solvent for the initial silver leach and as feed to the electrolytic unit wherein the copper was recovered by electro-deposition as metallic copper and the acid solvent regenerated and returned to the cycle through storage units to the final series of agitators. A desired portion of this general storage was bled from time to time to offset excessive acid generation or to control the excessive build-up of impurities in solution by evaporation of portions and the recovery of copper as copper sulphate, or by passing over an electro-positive metal for the recovery of copper as cement copper or combinations of both.

The grinding operation depicted at the head of the flow sheet was introduced to enable more ease in the handling of materials containing relatively large proportions of coarse material and for simplification of operation. While a portion of the leaching action occurs during the classification and grinding operations, the ultimate extraction is not appreciably greater than that obtained under similar time and temperature conditions with unground material.

The temperature and time requirements throughout the leaching operations are subject to considerable variation; however, temperatures in the range of 40° C.–60° C. allow preferable operating conditions. With such a range of operating temperatures adequate results may be obtained with contact periods during the various leaches of the following order, (1) initial silver leach, 0.75–1.5 hours, (2) neutralization leach, 3–6 hours, (3) final acid leach, 2–5 hours.

Throughout the foregoing procedure, the effect of silver precipitants was circumvented by, (1) roasting under suitable predetermined time and temperature conditions as to favor the dissociation of ferrous sulphate and afford the maximum economical opportunity for oxidation of metallic copper and the lower oxides of iron and copper, (2) maintenance, by the use of oxidizing agents such as potassium permanganate where rapid action and freedom of the solution from solid contaminant was desired, and manganese dioxide, in conjunction with air, where more time was available and the presence of solid contaminant not objectionable, of a balance of ferric ion concentration over ferrous ion concentration, utilizing the iron components inherent to the system, which continuously favored the solution of metallic silver.

In the specific application of the foregoing description it was found preferable to use potassium permanganate along with the partially neutralized electrolyte entering the low-acid to neutral agitators, and manganese dioxide in conjunction with air for control in the high acid agitators. In this manner, the solvent action of ferric sulphate on residual metallic silver was effected at the conclusion of the final leach and the resultant ferrous sulphate product of the reaction was converted to the ferric state as it contacted the partially leached calcine being fed to the low acid to neutral system. The quantity of oxidizing agent required for high extractions is obviously a function of the concentration of metallic silver, or of silver precipitants, in the material being treated; increasing proportions of these constituents increasing the required consumption of oxidizing agent or agents.

In the specific application under consideration, treating analogous materials, the consumption of oxidizing agent required for analogous extractions varied from 10 lbs. $MnO_2$ and 4 lbs. of $KMnO_4$ per ton of material, exposed to less suitable roasting conditions, to approximately 4 lbs. of $MnO_2$ and 2 lbs. of $KMnO_4$ per ton of material exposed to more suitable roasting conditions. In actual analogous treatment of identical calcine, in one case maintaining a suitable balance of excess ferric ion concentration over ferrous ion concentration, by means of the forementioned oxidizing agents, silver extraction of over 96 per cent was obtained as compared to silver extraction approaching 70 per cent when no control was exerted and the ferrous ion concentration allowed to assume unfavorable proportions.

From the foregoing description it will be ascertained that substantially higher hydrochemical extraction of silver, or of silver in conjunction with other constituents, than otherwise obtainable, may be effected from ores, concentrates, or other materials, containing varying proportions of silver, and a wide range of other constituents, by preliminary heat treatment under suitable time and temperature conditions, or by leaching in neutral or acid solvents, or combinations of both, in which a favorable balance of excess ferric ion concentration over ferrous ion concentration is maintained by the use of suitable oxidizing agents such as $KMnO_4$ of $MnO_2$, or by combinations of these procedures; the silver being recovered as metallic sponge by precipitation on an electro-positive metal, or as metallic silver by electro-deposition, and the silver barren solution wasted, or circulated as return solvent or advanced to subsequent operations for the extraction and recovery of other associated constituents.

It is evident that the above procedure and illustrations may be modified to meet the particular needs of the operations to which it is applied, and is not intended to restrict it to the particular examples given. The terms used in describing this invention have been used in their descriptive sense and not as terms of limitation and it is intended to include within the scope of the appended claims all equivalents of the procedures described.

Having thus fully described our invention, what we claim as new and desire to secure by Letters Patent is:

1. A process for extracting silver from ores, concentrates or other materials, which consists in treatment to form a calcine, then leaching the calcine in solutions containing an excess of ferric ion concentration over ferrous ion concentration such as to favor the solution of metallic silver, separating the solutions from the residual solids, and recovering the dissolved silver.

2. The herein described hydrochemical process for the extraction and recovery of silver from refractory sulphides in which the silver is selectively converted to its sulphate by calcination, then leached as such, high extractions being obtained by converting and maintaining all associated constituents in their higher oxide forms.

3. The hydrochemical process for the extraction and recovery of silver from refractory iron bearing sulphides in which the silver is selectively converted to its sulphate and the associated constituents to their higher oxide forms by calcination, as described, and the calcine leached in solutions containing an oxidizing agent, maintaining the oxidizing agent to favor the reaction $Fe_2(SO_4)_3 + 2Ag \rightarrow Ag_2SO_4 + 2FeSO_4$ by holding the ferrous ion concentration at a minimum.

4. The hydrochemical process for the extraction and recovery of silver from refractory sulphides in which the silver is selectively converted to its sulphate and the remaining associated constituents to their higher oxide forms by calcination, as described, and the calcine leached for the extraction of silver as silver sulphate in solutions containing an oxidizing agent, maintaining the oxidizing agent to hold both the solids and dissolved salts in their higher oxide states.

5. The herein described process for the extraction and recovery of silver from refractory sulphides which comprises calcination for the formation of silver sulphate and the higher oxides of the associated constituents, leaching the sulphate silver, then leaching the residual solids in sulphate solutions containing iron and an oxidizing agent, maintaining the oxidizing agent to favor the solution of metallic silver by holding the ferrous ion concentration at a minimum.

6. The herein described process for the extraction and recovery of silver from refractory materials which comprises calcination to form silver sulphate and the higher oxides of the associated constituents, washing the calcine free of sulphate silver, then leaching the residual solids in iron bearing sulphate solutions containing an oxidizing agent, maintaining the oxidizing agent to hold the ferrous ion concentration at a minimum, and recovering the dissolved silver as sponge.

HAROLD EUGENE LEE.
BARTON ROBERT MUIR.